United States Patent Office 3,194,036
Patented July 13, 1965

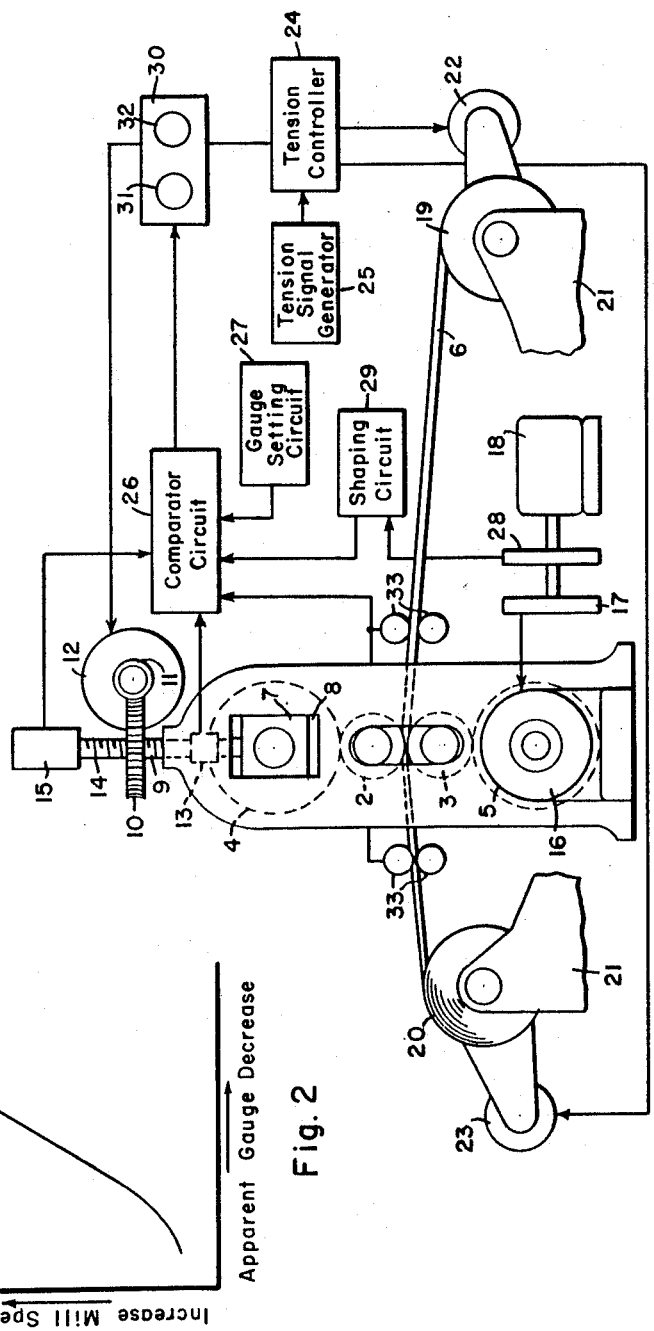

3,194,036
MATERIAL THICKNESS CONTROL APPARATUS
Kenneth Canfor, Dundas, Ontario, Canada, and Leonard R. Hulls, Gwynedd Valley, Pa., assignors to Canadian Westinghouse Company, Limited, Hamilton, Ontario, Canada
Continuation of application Ser. No. 760,677, Sept. 12, 1958. This application July 9, 1962, Ser. No. 208,207
Claims priority, application Canada, Jan. 2, 1958, 743,033, Patent 607,961
10 Claims. (Cl. 72—11)

The present application is a continuation of an earlier filed application, Serial No. 760,677, filed September 12, 1958, now abandoned, and entitled Material Thickness Control Apparatus, by the same inventors.

This invention relates to apparatus for reducing the thickness of material, such as metal strip, by passing the material through a thickness reducing member, such as a pair of opposed rolls or a die, and relates particularly to such apparatus which can be operated so as to obtain a more uniform thickness of the reduced material than has been possible hitherto.

A specific example of such apparatus is a rolling mill. The material entering the mill may vary in thickness and other properties along its length, and as a result, unless compensation is made for these variations of the incoming material, the outgoing material will also vary in thickness. In a method of correction that has been proposed in a copending application, now U.S. Patent No. 3,062,078, by L. R. Hulls, the necessary correction has been applied by making use of the fact that a mill obeys Hooke's law and therefore, during operation of the mill, the spacing between the rolls is equal to the initial spacing between them when unloaded plus an amount proportional to the strain of the mill, this strain being in turn proportional to the separating force that is established between the rolls by the material passing between them. In this method a first electric signal is produced representative of the separation setting of the said opposed material engaging surfaces of the rolls, a second electric signal is produced representative of the said separating force, and the said first and second electric signals are combined to produce an electric error signal. This electric error signal is then applied to adjust the tension of the material passing between the rolls and also to adjust the separation setting of the said opposed material engaging surfaces.

It has been found hitherto in the operation of such mills that the parts of the strip which pass through the mill while the rolls are being accelerated to or decelerated from their normal operating speed cannot be maintained accurately at the required thickness, and it has been necessary to discard such material as waste. We have discovered that a definite relation exists between the spacing of the mill rolls and the speed at which they are rotating, and accordingly we are able to make an appropriate correction to the roll spacing such that the guage is maintained within the required degree of accuracy for a greater length of the strip than has been possible hitherto.

Thus, in accordance with this invention there is provided apparatus for reducing the thickness of material including a thickness reducing member and means for controlling the apparatus automatically to maintain a substantially constant output thickness of the material, the thickness reduction by the member being a function of the speed of passage of the material through the member, the apparatus also including means causing said controlling means to operate the apparatus in accordance with the said speed of passage of the material to render the said reduction substantially independent of the said speed over a range of speeds.

Also in accordance with this invention there is provided in apparatus for reducing the thickness of material, a thickness reducing member having opposed material engaging surfaces between which a separating force is established by the material passing through the member, means for passing the material to be reduced in thickness under tension through the thickness reducing member, means for producing an electric signal representative of the separation setting of the said opposed material engaging surfaces, means for producing another electric signal representative of the said separating force, means for producing a further electric signal representative of the speed of travel of the material through the member, means for combining the said electric signals to produce an electric error signal, and means for adjusting the magnitude of the said tension within predetermined limits in response to the said electric error signal.

Further in accordance with this invention there is provided in apparatus for reducing the thickness of material, a thickness reducing member having opposed material engaging surfaces between which a separating force is established by the material passing through the member, means for passing the material to be reduced in thickness under tension through the thickness reducing member, means for producing an electric signal representative of the separation setting of the said opposed material engaging surfaces, means for producing another electric signal representative of the said separating force, means for producing a further electric signal representative of the speed of travel of the material through the member, means for combining the said electric signals to produce an electric error signal, and means for adjusting the separation setting of the said opposed material engaging surfaces in response to the electric error signal.

The said apparatus specified in the two immediately preceding paragraphs may include both the said means for adjusting the magnitude of the tension and the said means for adjusting the separation setting.

A rolling mill which is a specific embodiment of our invention will now be described by way of example with reference to the accompanying drawings wherein:

FIGURE 1 is a schematic diagram of the mill and its control system.

FIGURE 2 is a graph of a test carried out with the mill and control system of FIGURE 1.

There is illustrated in FIGURE 1 of the drawing a reversing rolling mill comprising a mill frame 1 in which are rotatably mounted a pair of opposed rolls 2 and 3 and a cooperating pair of back-up rolls 4 and 5, a strip 6 of material that is to be reduced in thickness passing between the opposed material engaging surfaces of the rolls 2 and 3. The upper back-up roll 4 is mounted for rotation by plummer blocks 7 (only one shown) the blocks being mounted for vertical sliding movement in respective slots 8 in the frame 1. The positions of the blocks 7, and thus the spacing of the material engaging surfaces of the rolls 2 and 3 are established by screws 9 (only one shown) which pass through corresponding screw-threaded bores in the frame 1, so that rotation of a pinion 10 mounted on the upper end of each screw causes the screw to move vertically relative to the frame. Rotation of each pinion 10 is effected by rotation of a respective worm gear 11 mounted on the shaft of an associated motor 12. A strain gauge 13 which is provided for each screw 9 measures the force of the screw 9 on its associated block 7 due to the separating force between the rolls 2 and 3, and hence measures the stress on the frame 1, which in accordance with Hooke's law is representative of the strain of the frame, and the additional separation of the rolls due to the said separating force. An extension shaft 14 is mounted on the upper surface of the pinion 10 and drives a position generator 15 which produces an electrical signal representative of the rotational position of the pinion 9, and hence representative of the separation setting of the rolls 2 and 3 without the separating force thereon.

The rolls of the mill are rotated by an electric motor 16 coupled to the lower back-up roll 5, the speed of the motor being controlled by a rheostat 17 operated by an electric motor 18. The ingoing metal strip 6 is fed from a coil 19 and through the rolls 2 and 3, the outgoing strip of reduced thickness being wound into another coil 20, the direction of travel of the strip reversing after each pass through the mill. The coils are mounted in a suitable supporting structure 21 (only a portion of which is shown) the structure supporting the coils at the appropriate distances from the mill and in the required spatial relation to the rolls of the mill. The reel 19 is mechanically coupled to an electric motor/generator 22, while the reel 20 is mechanically coupled to an electric motor/generator 23. As illustrated in FIGURE 1, the strip is passing from reel 19 to reel 20 and accordingly the motor/generator 23 serves as a motor and the motor/generator 22 serves as a drag generator. The two motor/generators are capable of control to adjust the tensions on the ingoing and the outgoing sides of the strip 6, so that the overall tension in the strip can be maintained at the selected value between limits which ensure that it will coil neatly and tightly without danger of breaking. The control for the motor/generators 22 and 23 is shown in the drawing as tension controller 24, which is in turn partly controlled by a tension signal generator or source 25 capable of manual setting by the mill operator to select the range of tension required for the gauge and type of strip that is being passed through the mill.

The electric signal derived from the strain gauge 13 is added to the signal from the position generator 15 in a circuit 26, such as is shown on page 14 of the book, Electronic Analog Computers by Granino A. Korn and Theresa M. Korn, McGraw-Hill Book Company (1952), the circuit adding the signals in the proportions required to produce a signal representative of the actual spacing between the rolls 2 and 3 during the operation of the mill, and thus representative of the thickness of the outgoing strip. Another electric signal which is representative of the desired thickness is produced in the gauge setting signal source 27 which can be adjusted manually by the mill operator, this signal also being fed to the circuit 26. A further electric signal is produced from a rheostat 28 and a shaping circuit 29, the rheostat 28 being mechanically coupled to the speed control rheostat 17 of the motor 16, so that the setting of the rheostat 28 is representative of the mill speed. The shaping circuit 29 gives the said further signal the required characteristic, as will be described below relative to FIGURE 2, and this further signal is also fed to the circuit 26. In this regard it should be noted that the comparator circuit 26 includes a summing amplifier device which algebraically sums or adds the various input signals supplied to it and then a comparison is made with the desired gauge signal from the source 27 to provide a resultant or error signal for correcting the strip tension and the screwdown setting. This electric error signal which is a resultant of the above four signals fed to the circuit 26 is applied through a circuit 30 to the tension controller 24 and the screw motor 12, the circuit 30 comprising a manually adjustable limiting circuit 31 and a manually adjustable gate circuit 32 whose functions will be described below. The tension controller 24 might be one such as shown in U.S. Patent 2,586,412 to A. J. Winchester, Jr. The tension signal generator 25 would be the potentiometer 66 controlling the pattern winding 53 of the regulating generator 48. The tension signal supplied from the circuit 30 would be applied to an additional winding of the regulating generator 48 of the Winchester patent.

To operate the mill, the mill operator sets the gauge signal generator or source 27 to indicate the gauge desired for the reduced strip, and also sets the tension signal generator 25 to give approximately the required range of tension about a mean value thereof, as dictated by his experience for the material and particular gauge to be rolled. In this regard each of the gauge signal generator 27 and the tension signal generator 25 may comprise a potentiometer member and a reference voltage source. The strip normally is subjected to a number of passes through the mill, and therefore there is no need for such close control of the output thickness during the initial passes as during the final passes. Accordingly, during the initial passes the operator sets the adjustable gate 32 so that no correction is attempted in the roll spacing until the output thickness is in error by more than the amount set by the gate.

As a general rule, with a relatively thick strip, a change in roll spacing is most effective in controlling the thickness of the strip, while a change in tension has comparatively little effect. As the thickness of the strip decreases the effect of changing roll spacing decreases and the effect of changing tension increases until with relatively thin strips a change in tension is more effective than a change in roll spacing. Therefore, during the initial passes the limiting circuit 31 is so set that it applies the error signal to cause operation of both the tension control 24 and the screw motors 12 (the operation thereof not being simultaneous owing to the operation of the gate 32, as described above), the setting of this circuit 31 being altered as the thickness of the rolled material decreases, until with the thinner materials the screw motors 12 are only operated if the tension control is unable to make the required corrections to the gauge.

If the combined electric signals when algebraically added from the strain gauge 13, the positional generator 15 and the shaping circuit 29 do not correspond to the signal set by the gauge signal generator 27, then the error signal is produced and is applied to cause operation of the tension control and the screw motors. As stated above, the said further signal is representative of the mill speed, the shaping circuit 29 giving the signal the characteristic necessary for modification of the error signal to produce the correction within the required limits. Such a shaping circuit can be designed by anyone skilled in the art from the information shown on page 275 of the aforementioned book to Korn and Korn. The way in which the said further signal changes as the mill speed changes is determined by the design of the electric circuits to which it is to be applied and, for example, it may be the type of signal which increases or decreases from zero or a bias value with increasing mill speed to a steady positive or negative value respectively while the mill is running at the required constant speed, or it may be the type which is zero only while the mill is running at the said required constant speed.

The tension control is operative relatively quickly upon application of the error signal but the change in tension is limited, as described above, and has relatively little effect in correcting the output thickness of the thick strip. The spacing control is operative relatively slowly since the motor armatures, the screws 9 and the rolls are masses of high inertia that must be moved, but once in operation it is very effective in correcting the output thickness of the thick strip. As the output thickness is brought to the correct value, the error signal is reduced until it is no longer effective.

As the thickness of the strip is reduced the mill operator resets the adjustable gate 32 so that the thickness is corrected for a smaller error thereof until, during the final passes of the strip, the system is correcting the strip thickness to the final desired limit. Also, as the thickness of the strip is reduced the limiting circuit 31 is reset so that the error signal is first effective to cause operation of the tension control and, only if the error signal persists after the maximum tension control correction has been applied, is it effective to cause operation of the spacing control.

Such an arrangement has the advantage that unnecessary operation of the screw motors 12 is avoided at the time when such operation is in any case relatively ineffective to produce correction.

An addition gauge monitor is provided on the mill in order to check the correct operation of the control system and also to give an indication of any permanent changes in the output thickness due, for example to temperature changes, or aging or malfunction of the system's components.

In the embodiment illustrated by the drawings this gauge monitor is shown as two flying micrometers constituted by respective pairs of rolls 33, but any other thickness gauge such as a radiation gauge may also be used. The monitor gauges are arranged to provide an electric signal representative of the correct output gauge of the rolled strip and this signal is fed to the circuit 26 and employed to correct the error signal that is fed to the tension and spacing controls. Since the mill illustrated is a reversing mill, two gauge monitors are required, one on each side of the mill, the gauge which is the output gauge being rendered effective as required.

The characteristic to be given to the said further electric signal by the shaping circuit 29 can be determined by practical tests on the mill in question, and the results of one such test is shown in FIGURE 2 of the drawing which consists of a graph in which the ordinate represents the speed of travel of a strip through the mill and the abscissa the apparent change in roll spacing. The effect of an increase in speed is to cause a decrease in roll spacing, and it is believed at present that one reason for this decrease may be due to increases in the thickness of the oil films in the bearing of the back-up rolls 4 and 5, such bearings normally being of the hydrodynamically-lubricated type, i.e. the type that in operation are fed with a constant stream of lubricant under pressure.

In the test illustrated by FIGURE 2, the rolls 2 and 3 were moved together until they contacted one another with a pressure within the normal operating range of the mill, the gauge setting circuit 27 being set so that a meter (not shown) associated therewith indicated a specific gauge value. The speed of the mill was then varied and the apparent change in gauge determined for different mill speeds. Since no strip was passing through the mill the apparent changes in gauge were due to changes in the mill itself. The shape of the characteristic for the said another signal in accordance with mill speed was derived from the results of the test. It will be seen from FIGURE 2 that with the mill under test the apparent gauge change was not linear at the lower mill speeds.

Although in this embodiment a special shaping circuit 29 is provided, in other embodiments the said further electric signal may be provided directly from the rheostat 28, which may for example be a variably tapped resistor having resistors of appropriate values between the tappings. Moreover, in other embodiments means other than the rheostat 28, with or without a shaping circuit such as 29, may be employed to produce the said further signal, for example, a tachometer generator can be employed to produce a voltage representative of the mill speed, the generator being driven, for example, by the motor 16 or by the guide rolls (not shown) that normally are provided to guide the strip entering and leaving the mill and also to determine the speed of movement of the strip.

As an example of the utility of the invention, it may be mentioned that with a mill for the production of steel strip suitable for tin plate the final passes produce approximately 15,000 linear feet of strip of 0.010 inch thickness ±0.0002 inch and in such mills as operated hitherto approximately 3% of each strip, consisting essentially of the strip ends, has been discarded because of incorrect thickness. By the application of the present invention this figure of 3% can be reduced to approximately 1½%, giving a 50% reduction in the amount of wasted strip.

A practical operation of a typical rolling mill equipped with the control apparatus shown in FIGURE 1, for rolling a strip having a thickness of 0.010 inch or 10 mils for example, could provide the following input signal relationships to the comparator circuit 26, originally for a low speed strip threading condition and then after speeding the rolling mill up to a run speed condition.

| Input Signal From— | Original Speed Condition, volts | After Speeding Mill Up to Run Speed, volts |
| --- | --- | --- |
| Gauge Setting Circuit 27 | +10 | +10 |
| Position Generator 15 | −8 | −9 |
| Strain Gauge 13 | −2 | −2 |
| Shaping Circuit 29 | 0 | +1 |

While our invention has been described in connection with a specific apparatus it is to be understood that it may be applied to other apparatus and various equivalents may be employed without departing from the scope of our invention.

We claim as our invention:

1. In control apparatus for reducing the thickness of material and operative with a thickness reducing member having opposed material engaging surfaces between which a separating force is established by the material passing through the member and means for passing the material to be reduced in thickness under tension through the thickness reducing member, the combination with signal producing means for producing an electric signal representative of the separation setting of the said opposed material engaging surfaces, second signal producing means for producing another electric signal representative of the said separating force, third signal producing means for producing a further electric signal representative of the speed of said material reducing members, fourth signal producing means for producing a still further electric signal representative of a desired output thickness of material from the apparatus and being manually adjustable for adjusting the magnitude of the said still further electric signal, signal combining means for combining the said electric signals to produce an electric error signal, tension adjusting means for adjusting the magnitude of the said tension within predetermined limits in response to the said electric error signal, and separation setting adjusting means for adjusting the separation setting of the said opposed material engaging surfaces in response to the electric error signal.

2. In control apparatus for reducing the thickness of material and operative with a thickness reducing member having oposed material engaging surfaces between which a separating force is established by the material passing through the member and means for passing the material to be reduced in thickness under tension through the thickness reducing member, the combination with first signal producing means for producing a first electric signal representative of the separation setting of the said opposed material engaging surfaces, second signal producing means for producing a second electric signal representative of the said separating force, third signal producing means for producing a third electric signal representative of the speed of said thickness reducing members, signal combining means for combining said first, second and third electric signals with a predetermined reference material thickness signal to produce an electric error signal, tension adjusting means for adjusting the magnitude of the said tension within predetermined limits in response to the said electric error signal, separation setting adjusting means for adjusting the separation setting of the said opposed material engaging surfaces in response to the electric error signal, and an adjustable gate device through which said electric error signal is applied to the separation setting adjusting means, with the adjustable gate device being operative for preventing operation of the latter said means in response to the error signal until the error signal has a predetermined value as determined by the adjustable gate device.

3. In control apparatus for reducing the thickness of material and operative with a thickness reducing member having opposed material engaging surfaces between which a separating force is established by the material passing through the member and means for passing the material to be reduced in thickness under tension through the thickness reducing member, the combination with signal producing means for producing an electric signal representative of the separation setting of the said opposed material engaging surfaces, second signal producing means for producing another electric signal representative of the said separating force, third signal producing means for producing a further elecrtic signal representative of the speed of said thickness reducing members, fourth signal producing means for producing a still further electric signal representative of a desired output thickness of material from the apparatus and adjusting the magnitude of the said still further electric signal, signal combining means for combining the said electric signals to produce an electric error signal, tension adjusting means for adjusting the magnitude of the said tension within predetermined limits in response to the said electric error signal, separation setting adjusting means for adjusting the separation setting of the said opposed material engaging surfaces in response to the electric error signal, and an adjustable gate device through which said electric error signal is applied to the separation setting adjusting means, with the adjustable gauge device being operative for preventing operation of the latter said means in response to the error signal until the error signal has a value determined by the adjustable gate device.

4. In control apparatus for reducing the thickness of material and operative with a thickness reducing member having opposed material engaging surfaces between which a separating force is established by the material passing through the member and means for passing the material to be reduced in thickness under tension through the thickness reducing member, the combination with first signal producing means for producing a first electric signal representative of the separation setting of the said opposed material engaging surfaces, second signal producing means for producing a second electric signal representative of the said separating force, third signal producing means for producing a third electric signal representative of the speed of said thickness reducing members, signal combining means for combining said first, second and third electric signals in reference to a desired material thickness to produce an electric error signal, tension adjusting means for adjusting the magnitude of the said tension within predetermined limits in response to the said electric error signal, separation setting adjusting means for adjusting the separation setting of the said opposed material engaging surfaces in response to the electric error signal, an adjustable gate device through which said electric error signal is applied to the separation setting adjusting means, with the adjustable gate device being operative for preventing operation of the latter said means in response to the error signal until the error signal has a predetermined value as determined by the adjustable gate device, and an output gauge monitor device for producing an electric signal in accordance with the actual output material thickness, with said gauge monitor device being operatively connected to said signal combining means for applying the last mentioned electric signal to correct said electric error signal for permanent changes in the output gauge of the reduced material.

5. In control apparatus for reducing the thickness of material and operative with a thickness reducing member having opposed material engaging surfaces between which a separating force is established by the material passing through the member and means for passing the material to be reduced in thickness under tension through the thickness reducing member, the combination with first signal means for producing an electric signal representative of the separation setting of the said opposed material engaging surfaces, second signal means for producing another electric signal representative of the said separating force, third signal means for producing a further electric signal representative of the speed of said thickness reducing members, signal combining means for combining the said electric signals relative to a reference thickness signal to produce an electric thickness error signal, and tension adjusting means for adjusting the magnitude of the said tension within predetermined limits about a predetermined mean value in response to the said electric error signal, separation setting adjusting means for adjusting the separation setting of the said opposed material engaging surfaces in response to the electric error signal, and manual control means for manually adjusting the said predetermined mean value of the tension magnitude.

6. In control apparatus for reducing the thickness of material and operative with a thickness reducing member having opposed material engaging surfaces between which a separating force is established by the material passing through the member and material passing means for passing the material to be reduced in thickness under tension through the thickness reducing member, the combination with a position generator coupled to the said member and operative for producing an electric signal representative of the separation setting of the said opposed material engaging surfaces, at least one strain gauge mechanically coupled to the thickness reducing member and operative for producing another electric signal representative of the said separating force, signal producing means for producing a further electric signal representative of the speed of said thickness reducing members, signal combining means for combining the said electric signals in reference to a desired thickness signal to produce an electric thickness error signal, tension adjusting means for adjusting the magnitude of the said tension within predetermined limits in response to the said electric error signal, and separation setting adjusting means for adjusting the separation setting of the said opposed material engaging surfaces in response to the electric error signal, wherein said signal producing means for producing a further electric signal includes a rheostat operatively connected to said material passing means for determining the speed of said thickness reducing members and wherein said signal producing means for producing a further electric signal includes a shaping circuit electrically connected to said rheostat and operative for determining the characteristic of said further electric signal.

7. In control apparatus for a rolling mill for reducing the thickness of strip material and operative with a pair of opposed rolls providing opposed material engaging surfaces between which a separating force is established by the material passing between the rolls and means including a motor for passing the material to be reduced in thickness under tension between the rolls, the combination with a position generator coupled to the said rolls and producing an electric signal representative of the separation setting of the said material engaging surfaces of the rolls, at least one strain gauge mechanically coupled to the said rolls and producing another electric signal representative of the said separating force, a rheostat device mechanically coupled to a motor control member determining the speed of rotation of the rolls and producing a further electric signal representative of the speed of said rolls, signal combining means for combining the said electric signals relative to a predetermined reference strip thickness to produce an electric thickness error signal, tension adjusting means for adjusting the magnitude of the said tension within predetermined limits in response to the said electric error signal, and separation setting adjusting means for adjusting the separation setting of the said opposed material engaging surfaces in response to the electric error signal.

8. In control apparatus for a rolling mill for reducing the thickness of strip material and operative with a pair of opposed rolls providing opposed material engaging surfaces between which a separating force is established by the strip material passing between the rolls, material passing means for passing the strip material under tension between the rolls, a pair of motor-operated screws associated with one of the said rolls and operable by actuation of the motors to adjust the separation setting of the said opposed material engaging surfaces, the combination wih at least one position generator coupled to at least one of the screws and producing an electric signal representative of the separation setting of the material engaging surfaces of the rolls, at least one strain gauge interposed between a respective screw and the associated backing roll and producing another electric signal representative of the said separating force, a rheostat device operatively connected to determine the speed of rotation of the rolls and operative for producing a further electric signal representative of the speed of said rolls, signal combining means for combining the said electric signals relative to a desired material thickness signal to produce an electric thickness error signal, means for adjusting the magnitude of the tension within predetermined limits in response to the said electric error signal, and means for actuating the motors of the motor-operated screws in response to the error signal.

9. In rolling mill control apparatus for reducing the thickness of material and operative with a thickness reducing member having opposed material engaging surfaces between which the material passes and a force is provided, the combination with output thickness control means for controlling the operation of said member in response to said force to maintain a substantially constant output thickness of the material, thickness reducing member speed sensing means operative with said member for controlling the spacing of the said surfaces as a function of the speed of said members, spacing control means causing said thickness control means to operate in accordance with said speed of said members and operative to render the said spacing substantially independent of the said speed over a range of speeds.

10. In rolling mill control apparatus for reducing the thickness of material and operative with a thickness reducing member having a pair of opposed rolls providing opposed material engaging surfaces between which the material passes to provide a force therebetween, the combination with control means operative with said member and responsive to said force for controlling the apparatus to maintain a substantially constant output thickness of the material such that the thickness reduction by the member is a predetermined function of said force and the speed of said member, roll speed sensing means operative with said member and causing said control means to operate the apparatus in accordance with the speed of said member and to render the reduction substantially independent of said speed over a predetermined range of speeds with the material passing between the opposed material engaging surfaces under tension, and with said control means controlling in a predetermined manner either one of the tension of the material or the spacing of the said surfaces to maintain a substantially constant output thickness of the material.

References Cited by the Examiner

UNITED STATES PATENTS

| 2,917,689 | 12/59 | Abell | 318—6 |
| 3,049,950 | 8/62 | Pearson | 80—56.2 |
| 3,062,078 | 11/62 | Hulls | 80—56.2 |

FOREIGN PATENTS

| 601,214 | 4/48 | Great Britain. |
| 774,373 | 5/57 | Great Britain. |

WILLIAM J. STEPHENSON, *Primary Examiner.*

CHARLES W. LANHAM, ROBERT F. WHITE, *Examiners.*